May 8, 1951 — W. R. LEONARD — 2,551,803
SAFETY PULLEY SHACKLE
Filed June 19, 1947
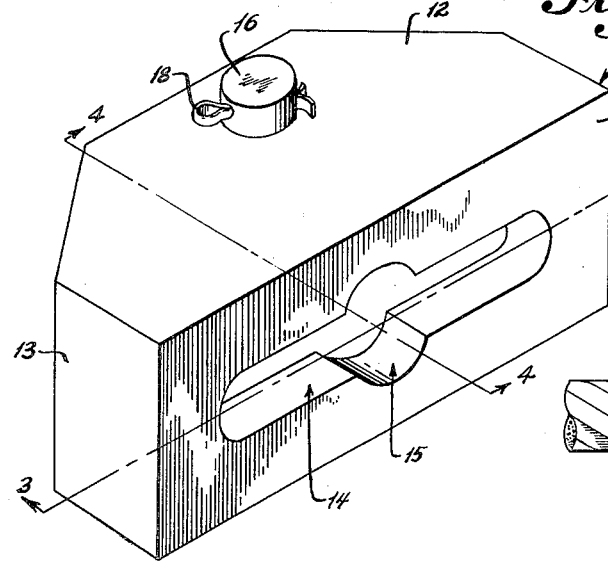
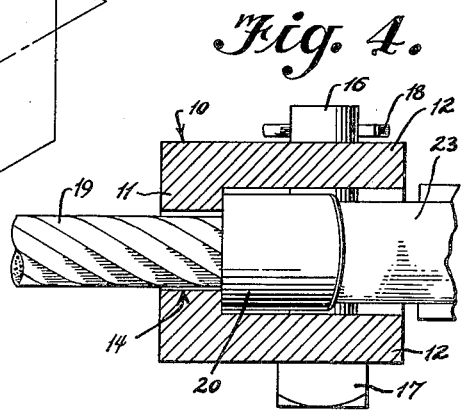
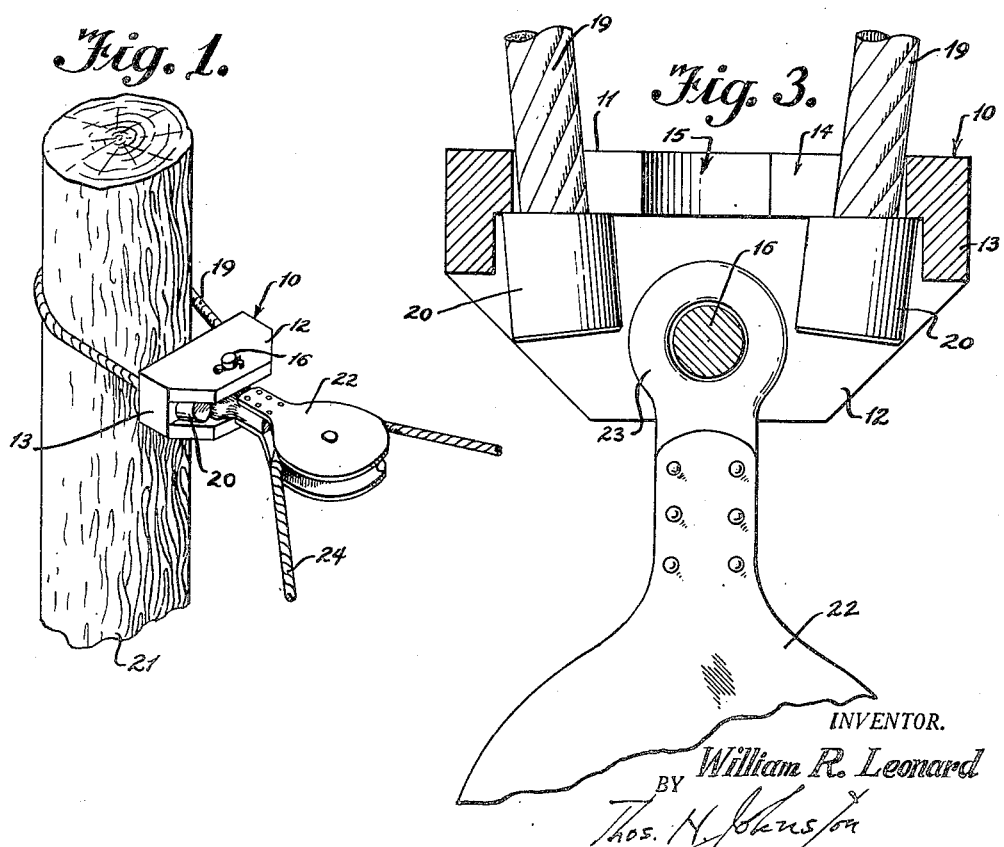
INVENTOR.
William R. Leonard
BY Thos. H. Johnston
ATTORNEY Patented May 8, 1951

2,551,803

UNITED STATES PATENT OFFICE 2,551,803

SAFETY PULLEY SHACKLE

William R. Leonard, Castle Rock, Wash.

Application June 19, 1947, Serial No. 755,814

1 Claim. (Cl. 24—123)

This invention relates to an improved safety shackle particularly intended for use in connection with the pulley blocks employed in logging operations, and is applicable in any instance where a wire rope strap is used to secure a pulley block to any object, such as a spar tree, spar stump, log boom, or the like.

Under prevalent practice, a wire rope strap having eyes at both ends is employed, and in order to form said eyes, about four feet of the cable at each end thereof is looped back to overlap the intermediate portion of the strap and secured to form said eyes. Thus, for instance, sixteen feet of cable is necessary to provide a strap only eight feet in effective length. Moreover, frequently recurring intermittent strain on the eyes causes the wire thereof to soon crystallize, with the result that the straps last only a short time.

The objects of the present invention, therefore, are to provide a shackle wherein knobs will be used on the ends of a length of cable to form a strap, thus effecting a saving in the length of cable necessary to provide a strap of any given lineal dimension as well as avoiding crystallization of the cable as recurringly experienced in connection with the eyes of conventional straps, wherein the shackle block will be formed to accommodate said knobs, securely anchoring the strap to the block, wherein the strap may be readily attached to or detached from the block, when so desired, wherein the knobs will be locked against accidental detachment from the shackle block by the conventional pulley block of the line or cable anchored by the shackle, and wherein the single pin employed to connect the line block with the shackle block will serve to detachably secure all of the parts in assembled relation.

Other and incidental objects of the invention will appear during the course of the following description, and in the drawings:

Figure 1 is a perspective view showing the shackle employed to anchor a conventional line block to a spar tree.

Figure 2 is a perspective view of the shackle block.

Figure 3 is a horizontal section on the line 3—3 of Figure 2 and showing the ends of the rope strap.

Figure 4 is a vertical section on the line 4—4 of Figure 2.

In carrying the invention into effect, I employ a shackle block, indicated as a whole at 10. This shackle block may be formed of steel, or other approved material, and includes a flat head plate 11, parallel cheek plates 12, and end plates 13 extending between the cheek plates at the ends of the head plate, the block preferably being a unitary structure. Formed in the head plate 11 medially thereof is a longitudinal slot 14 midway between the ends of which the walls of the slot are cut away to provide a circular opening 15.

In conjunction with the block 10, I provide a removable pin 16. This pin extends freely through the free marginal portions of the cheek plates 12 medially thereof and is provided at one end with a head 17, while near its opposite end, the pin is formed to removably receive a cotter key 18 detachably securing the pin in position.

I further employ a rope strap 19 which is formed of a suitable length of wire cable of appropriate diameter. Securely fixed to the ends of said strap in any approved manner are cylindrical metal knobs 20, and, as will be appreciated, these knobs supplant the usual looped eyes of conventional rope straps with a resultant economy in the length of cable necessary to provide a strap of any given lineal dimension. The knobs 20 are of a diameter to pass freely through the opening 15 of the block 10.

In the drawings, I have shown my improved shackle anchored to a spar tree 21, and have shown a conventional pulley block 22 connected to the shackle, said block being provided with the usual eye 23. A so-called high line 24 is shown as trained through the pulley block. It would appear unnecessary to enter into a description of the various lines, pulleys, and other equipment commonly employed, or the particular function of each part, as such outfits are well known.

In use, the strap 19 is looped about the spar tree 21, when the knobs 20, first one and then the other, are inserted through the opening 15 of the shackle block 10 and moved to the ends of the slot 14, the end walls of the slot being adapted to limit spreading of the ends of the strap. The eye 23 of the pulley block 22 is then inserted between the cheek plates 12 of the block 10, when the pin 16 is installed to extend through said eye, pivotally connecting the pulley block with the shackle block. Thus, the knobs 20 of the strap 19 will abut the inner face of the head plate 11 of the shackle block 10 so that the strap will serve to anchor the assembly to the spar tree.

It is now to be noted that the inner end faces of the knobs 20 are preferably beveled so that said knobs may sit flat against the inner face of the head plate 11 of the shackle block 10 at an angle more or less conforming to the divergent angularity of the end portions of the strap 19. Undue bending of the end portions of the strap, under strain, will thus be avoided and, of course, the inner ends of the knobs may be beveled at any chosen angle.

It is further to be noted that the eye 23 of the pulley block 22 is so connected with the shackle block 10 that said eye projects between the knobs 20 of the strap 19. The eye thus blocks movement of the knobs into registry with the opening 15 of the shackle block and serves to prevent accidental release of said knobs. However, by removing the single pin 16, the parts may, as will be seen, be readily detached from each other. The pin thus serves not only in its function to pivotally connect the pulley block 22 with the shackle block 10, but also the added function of a key locking all of the parts in assembled relation.

In any instance where it is desired to anchor the device to a stump or the like, the mode of assembly of the device is somewhat different from that above described for connecting the device with a tree. When it is desired to connect the device with a stump, for instance, quick and easy assembly of the device is accomplished by flexing the strap 19 to form a loop, when the bight of the loop is inserted between the cheek plates 12 of the shackle block 10 to project through the slot 14 of the head plate 11, after which the block is shifted forwardly along the end portions of the strap until the knobs 20 seat against the forward side of the head plate. Thus, both ends of the strap are simultaneously connected with the shackle block 10, following which the loop formed by the strap may be dropped over the stump for anchoring the device thereto. It will be noted that after the bight of the loop of the strap 19 is first inserted through the slot 14, as just above outlined, the shackle block 10 will restrain the end portions of the strap against spreading movement so that neither end of the strap may slip free to thrash about and possibly injure a workman.

Assuming the device to be connected to a tree, as shown in Figure 1 of the drawings, or connected to a stump, as just above described, it will be observed, as best brought out in Figure 3, that the slot 14 in the head plate 11 of the shackle block 10 provides an open space between the ends of the strap 19. Also, it will be noted that when forward strain is exerted on the pulley block 22, the end portions of said strap will tend to straighten and thus flex in a direction away from the end walls of the slot. Consequently, the ends of the strap will not be tensioned across any abrupt angles of the shackle block to abrade or otherwise injure the wire cable of the strap.

Having thus described my invention, I claim:

A pulley shackle including a shackle block having spaced confronting cheek plates connected at their rear ends by an oblong head plate provided with a longitudinal slot having end walls and side walls, the side walls of the slot being cut away medially of said slot to provide an opening, a rope strap having end portions connected by an intermediate portion adapted to be inserted between the forward ends of said cheek plates and moved rearwardly therebetween through said slot to extend at the rear of the block supporting the end portions of the strap to extend side by side transversely through said slot limited against movement into alignment with each other by the end walls of said slot, and knobs carried by the ends of said strap and of a major thickness greater than the width of said slot to engage the forward side of said head plate detachably connecting the end portions of the strap with the shackle block, said knobs being selectively movable into registry with said opening and being adapted to be selectively withdrawn therethrough for detaching first one end portion of the strap and then the other end portion thereof rearwardly from the block and both end portions of the strap being simultaneously movable forwardly side by side to draw the intermediate portion of the strap forwardly through said slot between the cheek plates for detaching the strap forwardly from the block.

WILLIAM R. LEONARD.

REFERENCES CITED

The following references are of record in the file of this patent:

UNITED STATES PATENTS

| Number | Name | Date |
|---|---|---|
| 686,829 | McEwen | Nov. 19, 1901 |
| 1,225,100 | Aubrey | May 8, 1917 |
| 1,429,110 | Seavey | Sept. 12, 1922 |
| 2,204,211 | Forrester | June 11, 1940 |
| 2,406,607 | Jensen | Aug. 27, 1946 |